United States Patent Office 3,083,198
Patented Mar. 26, 1963

3,083,198
NOVEL 2-ALKOXY STEROIDS AND PROCESSES FOR PREPARING THE SAME
John M. Chemerda, Metuchen, and Ralph F. Hirschmann, Scotch Plains, N.J., assignors to Merck & Co., Inc., Rahway, N.J., a corporation of New Jersey
No Drawing. Filed July 6, 1959, Ser. No. 824,922
6 Claims. (Cl. 260—239.55)

This application is a continuation-in-part of our pending application Serial No. 778,305, filed December 5, 1958, now abandoned.

This invention relates generally to processes for the manufacture of certain novel steroid compounds useful in production of physiologically active steroids, and the compounds thereby obtained. More particularly it is concerned with processes for making intermediuates and also certain novel final products that are possessed of anti-inflamatory activity, that are useful in treating androgen deficiencies, uterine disorders, lactation inhibitors, corpus luteum hormone deficiencies and that have anabolic activity. A characteristic of all of these steroid compounds according to this invention whether intermediates in the synthesis of other steroids or those that are per se physiologically active, is that in each instance the A-ring of the steroid molecule is modified, whether by substituents or otherwise, from the normal or characteristic A-ring of conventional steroids.

Among the novel A-ring modified steroids according to the present invention which may be therapeutically useful per se, in addition to being useful in the synthesis of other steroids, are A-norcortisone, 2-methoxy-hydrocortisone, A-norhydrocortisone, A-norprogesterone, A-nortestosterone and 11β-hydroxy-17α-methyl-A-nortestosterone.

In accordance with this invention is is found that 3-keto-$\Delta^{1(2),4(5)}$ steroids can be reacted with osmium tetraoxide in an organic solvent medium, such as pyridine, to produce an osmate ester which can be decomposed by treatment with hydrogen sulfide to yield a steroid retaining an α,β-unsaturated ketone system in the 3,4-5 positions and bearing a hydroxyl group of uncertain configuration in each of the 1 and 2 positions. In accordance with this invention it is found further that this reaction product can be subjected to dehydration by an alkali metal alkoxide of a lower alkanol in a lower alkanol solution to yield the alkali metal derivative of the corresponding 2-hydroxy-keto-$\Delta^{1(2),4(5)}$ steroid.

In accordance with this invention it is further found that this alkali metal steroid derivative may be reacted with an alkyl halide to produce a 2-alkoxy steroid, or it may be treated with a dilute aqueous alkali metal hydroxide solution at an elevated temperature, followed by acidification, to effect formation of a mixture of two 2ξ-hydroxy-2ξ-carboxy steroids, one of which is a 2ξ,5ξ-dihydroxy-2ξ-carboxy-A-nor-pregnane and the other of which is a 2ξ-hydroxy-2ξ-carboxy-$\Delta^5$-A-nor-pregnene. According to a still further aspect of this invention, this mixture of 2-hydroxy-2-carboxy compounds or either compound, after separation from the other, is converted to a steroid having a keto group in the 2-position followed by treatment with a strong base to form a steroid having a double bond in the position $\Delta^{3(5)}$ by either of two alternate routes: By the first route, the mixture of 2-hydroxy-2-carboxy steroids or either of the 2-hydroxy-2-carboxy steroids, after separation from the other, is reduced by treatment with an alkali metal aluminum hydride followed by oxidation of an alkali metal perhalide, which product is then treated with an alkali metal lower alkoxide to yeld the desired 2-keto-$\Delta^{3(5)}$-A-nor steroid; or by the second route, the mixture of 2-hydroxy-2-carboxy compounds or either compound, after separation from the other, is converted to a steroid having a keto group in the 2-position by treating the selected compound or mixture with lead tetraacetate in an organic solvent medium such as a mixture of benzene and methanol, and then contacting the reaction product to produce a 2-keto-$\Delta^{3(5)}$-A-nor-pregnene by treatment with a dilute solution of a strong acid or a strong base to yield to desired product or products.

It will be understood by those skilled in the art to which this invention relates that in the aforesaid reactions certain groups that may be present in the steroid may be protected to prevent them from entering into reaction with production of undesired co-products. For example, a keto group, if present in the 20-position, may be protected by initial reaction of the steroid starting material with ethylene glycol to produce the corresponding ketal. Likewise, a steroid having hydroxyl groups in the 17 and 21 positions may be protected by initially forming the 17-20,20-21-bismethylenedioxy derivative. It will be evident to those skilled in the art to which this invention relates that the processes of this invention may be employed effectively to produce novel steroids variously substituted in the positions not directly involved in the reaction herein described. It also will be evident that intermediates produced in the course of these reactions may be subjected to other reactions for production of physiologically active steroids other than those specifically mentioned herein.

To facilitate a fuller and more complete understanding of the subject matter of this invention, certain specific examples herewith follow, but it is clearly to be understood that these examples are provided by way of illustration merely and are not to be construed as imposing limitations upon the scope of the invention defined in the subjoined claims.

EXAMPLE 1

*Synthesis of 2-Methoxyhydrocortisone*

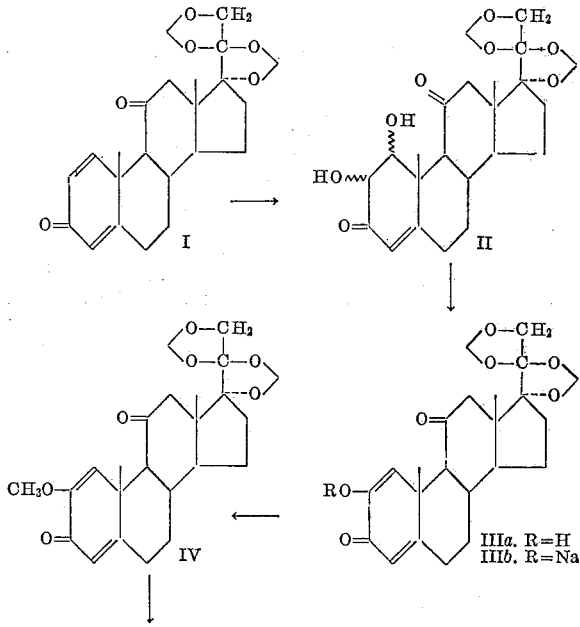

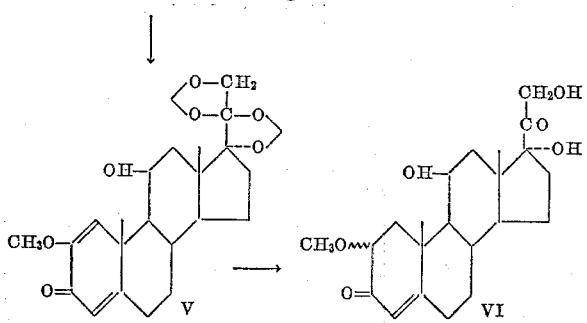

A solution of 100 grams of prednisone bismethylenedioxy derivative I (the 17-20,20-21-bismethylenedioxy derivative of $\Delta^{1,4}$-pregnadiene-17α,21-diol-3,11,20-trione) in 720 milliliters of pyridine is cooled to 5° C. and treated with a solution of 69.9 grams of osmium tetraoxide in 408 milliliters of pyridine. The mixture, which turns black within about five minutes, is allowed to stand at room temperature for five days when it is added with stirring to 13.4 liters of petroleum ether. The crude osmate ester is isolated by filtration and washed with petroleum ether to remove most of the residual pyridine. The crude product is then dissolved in 8 liters of dioxane and kept in an icebath while a slow stream of hydrogen sulfide is bubbled through the reaction mixture. The precipitated osmium dioxide is removed by filtration, and the filtrate is concentrated to dryness in vacuo. The residual foam is dissolved in 2 liters of acetone, decolorized with activated carbon, filtered and concentrated to a volume of 1 liter. Addition of 1 liter of Skellysolve B affords 36 grams of the 17-20,20-21-bismethylenedioxy derivative of 1ξ,2ξ-dihydroxy-cortisone II, $\lambda_{max.}^{CH_3OH}$ 236 m$\mu$ (log E 4.15); $\lambda_{max.}^{CHCl_3}$ 2.85$\mu$, 5.95$\mu$, 6.15$\mu$, shoulder at 5.85–5.90$\mu$, $\lambda_{max.}$ 9–9.2$\mu$ When inserted into a melting point bath at 200° C., the compound is found to undergo a change in crystal structure which does not involve a dehydration to compound III as shown by paperstrip chromatography. The mother liquor affords two further crops, melting at 228°–230° C., amounting to 3.48 grams and 10.55 grams, respectively. Further recrystallization of the first crop from the same solvent pair raises the melting point to 244°–245° C. (70% recovery). An anlytical sample is obtained by paper chromatography using methanol formamide (2:1) as the stationary phase and chloroform as the mobile phase. Isolation by crystallization from acetone Skellysolve B does not give a sample of improved melting point.

Analysis.—Calcd. for $C_{27}H_{30}O_8 \cdot C_3H_6O$: C, 63.40; H, 7.37. Found: C, 63.84; H, 7.35.

The compound gives a positive tetrazolium test and a negative ferric chloride test. The extinction of the former is found to be about two-thirds that given by cortisone free alcohol.

To a solution of 3.09 grams of the above glycol II in 75 milliliters of hot methanol is added 52 milliliters of a solution of sodium methoxide in methanol (0.14 N). The mixture is heated on a steambath until a tetrazolium test is essentially negative. The bulk of the methanol is removed in vacuo, about 250 milliliters of ether is added and the product is isolated by filtration, affording 3.15 grams of a very hygroscopic solid, $\lambda_{max.}^{0.1 N\ NaOH}$ 226 m$\mu$ (log E 4.18) 352 m$\mu$ (3.41); shoulder at 252 m$\mu$ (3.86); $\lambda_{max.}^{CHCl_3}$ 5.86$\mu$, 6.05$\mu$, 6.2$\mu$, 6.32$\mu$, 9.05–9.2$\mu$ This substance is the sodio derivative of the 17-20,20-21-bis-methylenedioxy derivative of 2-hydroxy-$\Delta^{1,2}$-cortisone, IIIa. In another experiment (14.5-gram scale), treatment of the glycol II with a 5% excess of sodium methoxide afford 11.39 grams of the sodio-derivative IIIb. The latter sample is dried at 100° C. for two hours, resulting in a weight loss of 8%.

Analysis.—Calcd. for $C_{23}H_{27}O_7Na \cdot (H_2O)_{1/2}$: C, 61.73; H, 6.31; Na, 5.14. Found: C, 61.94; H, 6.39; Na, 4.93.

This preparation is found to decompose to a large extent on standing at room temperature for three months. In methanol the sodium salt shows the characteristic ultraviolet absorption pattern of the free compound IIIa ($\lambda_{max.}$ 252 m$\mu$, infl. 292 m$\mu$). Upon reacting the sodio-derivative IIIb with methyl iodide by refluxing in acetone, the monomethyl ether IV, the 17-20,20-21-bis-methylenedioxy derivative of 2-methoxy-$\Delta^{1,2}$-cortisone, is obtained as follows: A solution of the sodio-derivative IIIb in a mixture of 100 milliliters of acetone and 3 milliliters of methyl iodide is refluxed in a nitrogen atmosphere. Solvents are removed in vacuo and the residue distributed between dilute aqueous sodium hydroxide and chloroform. The neutral fraction is recrystallized from acetone-Skellysolve B to give the desired product, a material melting at 252°–264° C. (dec.)

Analysis.—Calcd. for $C_{24}H_{30}O_7$: C, 66.96; H, 7.02. Found: C, 66.60; H, 7.00.

300 milligrams of the 11-ketosteroid IV is stirred with 40 milligrams of sodium borohydride in a mixture of 17.4 cubic centimeters of tetrahydrofuran and 1.7 cubic centimeters of water at 0°–5° C. for 20 hours. Excess of hydride was decomposed by the addition of dilute hydrochloric acid. The tetrahydrofuran was removed in vacuo and the crude product separated by filtration and purified by recrystallization from aqueous acetone. This product is the 17-20,20-21-bismethylenedioxy derivative of 2-methoxyprednisolone V.

About 200 milligrams of compound V is dissolved in about 20 milliliters of 60% formic acid at room temperature. The solution is greenish-yellow in color but soon turns a much lighter color. After standing at room temperature for about 65 hours, the solution is concentrated in vacuo to a volume of 3 milliliters, using a 30°–32° C. bath as a heat source. Ice is added and the mixture is chilled at 0° C. for 30 minutes. The product is found to have about the same mobility as prednisolone by paper chromatography using methanol formamide as the stationary phase and chloroform as the mobile phase. It shows an absorption maximum at 245 m$\mu$ (E% 328) in methanol. That the methoxy group has been left intact may be demonstrated by the fact that the position of the ultraviolet absorption maximum is unaffected by the addition of base. In the infrared, the compound showed $\lambda\lambda_{max.}$ at 2.85–3.0$\mu$, 5.88$\mu$, 6.04$\mu$, 6.12$\mu$ (XBr pellet).

To effect the conversion of compound V to the desired 2-methoxyhydrocortisone VI, the former is reduced with sodium borohydride in aqueous methanol in the presence of sodium hydroxide, then the total product in chloroform solution is oxidized with manganese dioxide at room temperature. The reaction product, after chromatographic purification is found to be the 17-20,20-21-bis-methylenedioxy derivative of 2-methoxyhydrocortisone. Removal of the bismethylenedioxy protecting group is effected by treatment with 60% formic acid at room temperature for three days, then distributing the mixture between chloroform and water, back extracting the aqueous layer with chloroform, combining the organic layers, washing with water, with sodium bicarbonate solution and with a saturated aqueous sodium chloride solution. The desired product is isolated by paper chromatography using Whatman #4 paper with methanol-formamide (1:1) as the stationary phase and chloroform as the mobile phase. This compound (VI) exhibited cortisone-like activity.

EXAMPLE 2

Synthesis of A-Nortestosterone

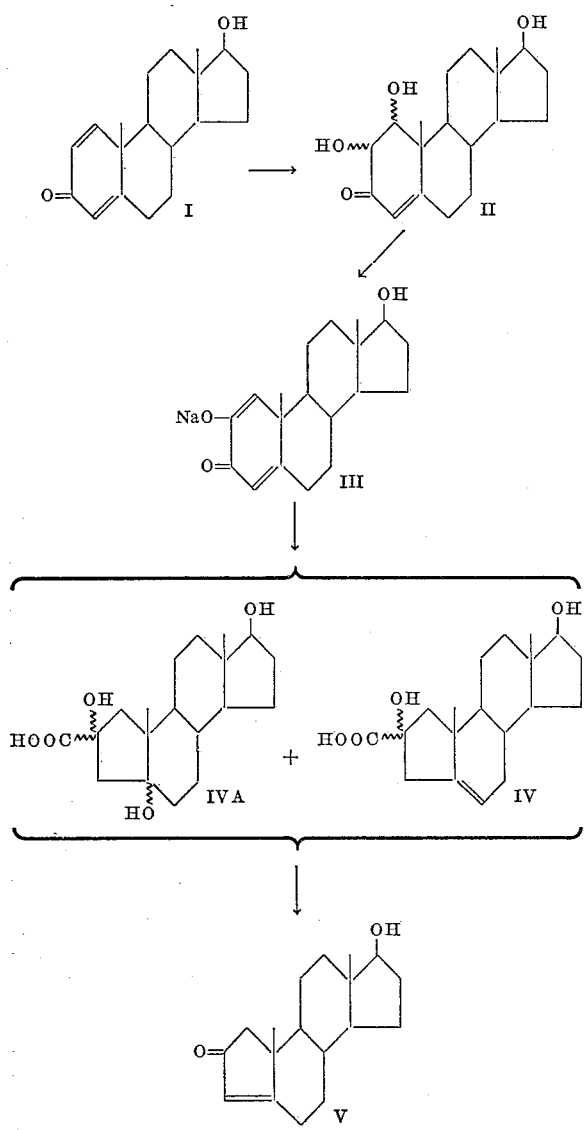

A solution of 7.2 grams of $\Delta^1$-testosterone I in 72 milliliters of pyridine is cooled to 5° C. and treated with a solution of 7 grams of osmium tetraoxide in 40 milliliters of pyridine. The mixture, which turns black within five minutes, is allowed to stand at room temperature for five days when it was added with stirring to about 1.5 liters of petroleum ether. The crude osmate ester is isolated by filtration and washed with petroleum ether to remove most of the residual pyridine. The crude product is then dissolved in about 600 milliliters of dioxane and kept in an icebath while a slow stream of hydrogen sulfide is bubbled through the reaction mixture. The precipitated osmium dioxide is removed by filtration, and the filtrate is concentrated to dryness in vacuo. The residual foam is dissolved in about 200 milliliters of acetone, decolorized with activated carbon, filtered and concentrated to a volume of about 100 milliliters. Addition of about 100 milliliters of Skellysolve B causes separation of the desired reaction product, 1ξ,2ξ-dihydroxytestosterone II.

This reaction product, compound II, is dissolved in methanol and reacted with a stoichiometric equivalent of sodium methoxide while the mixture is heated on a water bath, substantially in a manner analogous to that above described in connection with the preparation of compound III of Example 1. After removal of the solvent and addition of ether, the desired reaction product, the sodio-derivative of $\Delta^{1,4}$-androstadiene-2,17β-diol-3-one III is obtained.

This reaction product, compound III, is heated overnight on a steambath under an atmosphere of nitrogen with a 1.55 N aqueous sodium hydroxide solution. The solution is acidified in the cold and the resulting acid, compound IV, is extracted into ethyl acetate and washed with saturated aqueous salt solution. The acid extract is then extracted as its sodium salt into aqueous sodium bicarbonate solution, followed by reacidification and extraction into ethyl acetate. Upon removal of the solvent, the mixture of reaction products, 2ξ-carboxy-2ξ-hydroxy-A-nor-5-pregnen-17-ol and 2ξ-carboxy-2ξ,5ξ-dihydroxy-A-nor-pregnan-17-ol, compounds IV and IVA, are obtained as an amorphous solid.

This amorphous solid containing a mixture of compounds IV and IVA is dissolved in a benzene-methanol (1:2) mixture and lead tetraacetate is added. The mixture is allowed to stand at room temperature overnight, then the solvents are removed in vacuo and the residue is distributed between ether-benzene (3:2) and water. The aqueous layer is back extracted with benzene and the combined organic layers are washed with aqueous sodium bicarbonate solution and then with a saturated aqueous solution of sodium chloride. This organic solution of the crude mixture of products, 2-keto-A-nor-5-pregnen-17-ol, compound V and 2-keto-A-nor-pregnane-5ξ,17-diol, compound VA, is treated with a dilute (0.86 N) solution of sodium methoxide in methanol for a period of about 2 hours at room temperature, then the mixture is neutralized by the addition of acetic acid, the solvents are removed and water is added, yielding the desired final product, A-nortestosterone VI.

EXAMPLE 3

Synthesis of A-Norprogesterone 1-dehydroprogesterone is refluxed in benzene solution with ethylene glycol and p-toluenesulfonic acid until one mole of water has been collected. The mixture is cooled and neutralized with base. After drying over magnesium sulfate, a drop of pyridine is added to the neutral solution and the solvent is removed in vacuo. Chromatography yields the 20-ketal of 1-dehydroprogesterone, compound II.

A solution of this compound II in pyridine is cooled to 5° and treated with a solution of osmium tetraoxide in pyridine. The mixture, which turns black within five minutes, is allowed to stand at room temperature for five days when it is added with stirring to a relatively large volume of petroleum ether. The crude osmate ester is isolated by filtration and washed with petroleum ether to remove most of the residual pyridine. The crude product is then dissolved in dioxane and kept in an icebath while a slow stream of hydrogen sulfide is bubbled through the reaction mixture. The precipitated osmium dioxide is removed by filtration, and the filtrate is concentrated to dryness in vacuo. The residual foam is dissolved in acetone, decolorized with activated carbon, filtered and concentrated to about half its volume and, upon addition of an equal volume of Skellysolve B yields the desired reaction product, the 20-ketal derivative of 1ξ,2ξ-dihydroxy-$\Delta^4$-pregnene-3,20-dione, compound III.

To a solution of compound III in hot methanol is added a solution of sodium methoxide in methanol (0.14 N). The mixture is heated on a steambath until a tetrazolium test is found to be essentially negative. The bulk of the methanol is removed in vacuo, ether is added and the product is isolated by filtration, yielding as a very hygroscopic solid, the sodio-derivative of the 20-ketal of 2-hydroxy-$\Delta^{1,4}$-pregnadiene-3,20-dione, compound IV.

A mixture of this compound IV with 1.55 N aqueous sodium hydroxide solution is heated overnight on a steambath under an atmosphere of nitrogen, then the solution is cooled and acidified, forming a mixture of acids comprising 2ξ-carboxy-2ξ-hydroxy-A-nor-5-pregnen-20-one 20-ketal derivative and 2ξ,5ξ-dihydroxy-2ξ-carboxy-A-nor-pregnen-20-one 20-ketal derivative, compound VA. The mixture of acids is extracted into ethyl acetate, washed with a saturated aqueous salt solution, converted to its sodium bicarbonate solution, followed by reacidification and extraction into ethyl acetate. Removal of the solvent yields compounds V and VA as a purified amorphous mass.

The total bicarbonate-soluble fraction of the mixture of compounds V and VA is contacted with lead tetraacetate in benzene-methanol solution at room temperature overnight, essentially as described in Example 2 in connection with compound V thereof. After removal of solvents, the residue is distributed between ethyl acetate and water, and the organic layer is washed until neutral, then taken to dryness. The mixture of products so obtained is compound VI, the 20-ketal derivative of A-nor-5-pregnane-2,20-dione and compound VIA, the 20-ketal derivative of 5ξ-hydroxy-A-norpregnane-2,20-dione.

To remove the 20-ketal protective groupings and form compound VII, A-nor-4-pregnene-2,20-dione, 0.50 gram of the mixture of compounds VI and VIA, suspended in 100 milliliters of methanol, is treated with 5 milliliters of a sulfuric acid solution (8.5% $H_2SO_4$ in $H_2O$ v./v. and refluxed for two hours. The mixture is neutralized and solvents are removed in vacuo. The residue is dissolved in chloroform and washed with water. Chromatography of the crude product yields a purified form of compound VII, A-norprogesterone, which is orally effective as a progestational agent.

EXAMPLE 4

*Synthesis of 11β-Hydroxy-17α-Methyl-A-Nortesterone*

A solution of 100 grams of prednisone bismethylenedioxy derivative I (the 17-20,20-21-bismethylenedioxy-derivative of $\Delta^{1,4}$-pregnadiene-17α,21-diol-3,11,20-trione) in 720 milliliters of pyridine is cooled to 5° C. and treated with a solution of 69.9 grams of osmium tetraoxide in 408 milliliters of pyridine. The mixture, which turns black within about five minutes, is allowed to stand at room temperature for five days when it is added with stirring to 13.4 liters of petroleum ether. The crude osmate ester is isolated by filtration and washed with petroleum ether to remove most of the residual pyridine. The crude product is then dissolved in 8 liters of dioxane and kept in an icebath while a slow stream of hydrogen sulfide is bubbled through the reaction mixture. The precipitated osmium dioxide is removed by filtration, and the filtrate is concentrated to dryness in vacuo. The residual foam is dissolved in 2 liters of acetone, decolorized with activated carbon, filtered and concentrated to a volume of 1 liter. Addition of 1 liter of Skellysolve B affords 38 grams of the 17-20,20-21-bismethylenedioxy derivative of 1ξ,2ξ-dihydroxy cortisone II, $\lambda_{max.}^{CH_3CH}$ 236 mμ (log E 4.15); $\lambda_{max.}^{CHCl_3}$ 2.85μ, 5.95μ, 6.15μ, shoulder at 5.85–5.90μ, $\lambda_{max.}$ 9–9.2μ

When inserted into a melting point bath at 200° C., the compound is found to undergo a change in crystal structure and melted at 232°–234° C. which does not involve a dehydration to compound III as shown by paperstrip chromatography. The mother liquor affords two further crops, melting at 228°–230° C., amounting to 3.48 grams and 10.55 grams, respectively. Further recrystallization of the first crop from the same solvent pair raises the melting point to 244°–245° C. (70% recovery). An analytical sample is obtained by paper chromatography using methanol formamide (2:1) as the stationary phase and chloroform as the mobile phase. Isolation by crystallization from acetone Skellysolve B does not give a sample of improved melting point.

*Analysis.*—Calcd. for $C_{27}H_{30}O_8 \cdot C_3H_6O$: C, 63.40; H, 7.37. Found: C, 63.84; H, 7.35.

The compound gives a positive tetrazolium test and a negative ferric chloride test. The extinction of the former is found to be about two-thirds that given by cortisone free alcohol.

To a solution of 3.09 grams of the above glycol II in 75 milliliters of hot methanol is added 52 milliliters of a solution of sodium methoxide in methanol (0.14 N). The mixture is heated on a steambath until a tetrazolium test is essentially negative. The bulk of the methanol is removed in vacuo, about 250 milliliters of ether is added and the product is isolated by filtration, affording 3.15 grams of a very hygroscopic solid, $\lambda_{max.}^{0.1 N\ NaOH}$ 226 mμ (log E>4.18) 352 mμ (3.41); shoulder at 252 mμ (3.86); $\lambda_{max.}^{CHCl_3}$ 5.86μ, 6.05μ, 6.2μ, 6.32μ, 9.05–9.2μ

This substance is the sodio derivative of the 17-20-20-21-bis-methylenedioxy derivative of 2-hydroxy-$\Delta^{1,2}$-cortisone. In another experiment (14.5-gram scale), treatment of the glycol II with a 5% excess of sodium methoxide affords 11.39 grams of the sodio-derivative III. The latter sample is dried at 100° C. for two hours, resulting in a weight loss of 8%.

*Analysis.*—Calcd. for $C_{23}H_{27}O_7Na \cdot (H_2O)_{1/2}$: C, 61.73; H, 6.31; Na, 5.14. Found: C, 61.94; H, 6.39; Na, 4.93.

This preparation is found to decompose to a large extent on standing at room temperature for three months. In methanol the sodium salt shows the characteristic ultraviolet absorption pattern of the free compound ($\lambda_{max.}$ 252 mμ, infl. 292 mμ).

A mixture of 5.05 grams of the above sodio-derivative III is heated on a steambath overnight in a nitrogen atmosphere with 240 milliliters of a 1.55 N aqueous solution of sodium hydroxide. The solution is acidified in the cold, the resulting acid extracted into ethyl acetate and washed with a saturated salt solution. The acid is purified via its sodium salt by extraction into sodium bicarbonate followed by reacidification and extraction into ethyl acetate. Removal of the solvent gives an amorphous solid which is decolorized with activated carbon and crystallized from acetone Skellysolve B. This product is a mixture of compounds including 17α-20,20-21-bismethylenedioxy - 2 - hydroxy - 2ξ - carboxy - A - nor - 5 - pregnen-11-one and 17α-20,20-21-bismethylenedioxy-2ξ,5ξ-dihydroxy-2-carboxy-A-norpregnan-11-one which may be separated by fractional crystallization. The initial crystalline crop melts at 197°–199.5° C. (dec.). Further recrystallization from methanol-water and then from acetone-Skellysolve B gives the colorless, analytically pure acid as a hydrate, melting point 202°–203° C., $[\alpha]_D^{Py}$ —75.5°. For convenience hereinafter, this compound is referred to as compound IVA.

*Analysis.*—Calcd. for $C_{23}H_{30}O_8 \cdot H_2O$: C, 61.05; H, 7.13. Found: C, 60.91; H, 7.03.

The mother liquor from the initial crystallization of compound IVA is taken to dryness. Dissolution in acetone, followed by the addition of Skellysolve B, gave only a red oil. The supernatant liquor is separated by decantation and affords, after the addition of more Skellysolve B, a crystalline solid, compound IVB, melting at about 220° C. Repeated recrystallization from the same solvent pair gives an analytical sample, melting at 250–252° C., $[\alpha]_D^{Py}$ —98.3°.

*Analysis.*—Calcd. for $C_{23}H_{30}O_8$: C, 63.58; H, 6.96. Found: C, 63.63; H, 6.89.

Compound IVA is 17α-20,20-21-bismethylenedioxy-2ξ,5ξ - dihydroxy - 2ξ - carboxy - A - norpregnan - 11 - one and compound IVB is 17α-20,20-21-bismethylenedioxy-2ξ-hydroxy-2ξ-carboxy-A-nor-5-pregnen-11-one.

In another experiment, 2.0 grams of the sodio-derivative III is suspended in a solution of 38.6 grams of barium hydroxide in 265 milliliters of water and heated on a steambath with vigorous stirring in a nitrogen atmosphere overnight. The mixture is filtered, the filtrate made acid to Congo red and the acid extracted with ethyl acetate.

The A-nor acid is purified via its sodium salt as described above. Crystallization from acetone Skellysolve B gives compound IVB, melting at about 240°–245° C.

A 2.65 gram sample of the glycol, compound II, is dissolved in 35 milliliters of methanol, 5 milliliters of a 2.5 N aqueous solution of sodium hydroxide is added and the mixture is refluxed for about three minutes (negative tetrazolium test), then the bulk of the solvents is removed in vacuo. The residue, which is insoluble in water, is acidified with hydrochloric acid, the diosphenol reaction product is extracted into ethyl acetate and the resulting solution is washed with a saturated salt solution. An aliquot is taken to dryness to afford the crude diosphenol, $\lambda_{max.}^{CH_3CH}$ 252 m$\mu$ (log E 4.05), infl. 292 m$\mu$ (3.43)

Addition of one drop of 2.5 N aqueous sodium hydroxide solution per 10 milliliters of solution is found to produce a marked change in the spectrum: $\lambda_{max.}$ 226 m$\mu$ (log E 4.24), 345 m$\mu$ (3.23), infl. 250 m$\mu$ (3.89); this change can be reversed with acid.

The bulk of the organic layer, which still contains mineral acid, is repeatedly extracted with a dilute solution of sodium hydroxide causing the sodium salt of the diosphenol compound III to separate at the interface. The combined solids are heated on a steambath with 300 milliliters of 1.1 N aqueous sodium hydroxide overnight. The isolation of the A-nor acid isomer A, melting at 197°–200° C., is carried out essentially as described above.

After separation of the interface-solids from the dehydration step, as described above, the ethyl acetate layer is washed until neutral, dried and taken to dryness. The residue, which leaves no residue on burning, is shown to be the free diosphenol on the basis of its ultraviolet absorption spectrum. In the infrared it shows $\lambda_{max.}^{Nj}$ 2.99$\mu$, 5.85$\mu$, 6.07$\mu$; $\lambda_{max.}^{CHCl_3}$ 2.9$\mu$, 5.85$\mu$, 5.96$\mu$, 6.08$\mu$, 6.18$\mu$, 9.–9.2$\mu$ About 615 milligrams of lithium aluminum hydride, suspended in 29 milliliters of dry dioxane, is heated to reflux in a nitrogen atmosphere. A solution of 525 milligrams of the 17-20,20-21-bismethylenedioxy derivative of 2ξ - carboxy - 2ξ,5ξ,17α,21 - tetrahydroxy - A - nor - 5 - pregnene-11,20-dione, compound IVA, melting at 196°–198° C., in 40 milliliters of dioxane is added over a period of twenty-five minutes. After refluxing has continued for an additional hour, the mixture is cooled, excess hydride is decomposed with ethyl acetate, and a saturated solution of sodium chloride is added. The mixture is filtered and the inorganic residue is washed with more ethyl acetate. The combined ethyl acetate extracts are washed with a solution of sodium bicarbonate and then with a saturated salt solution, dried and taken to dryness to give an amorphous foam consisting of a mixture of the 11-epimers, represented by Formula V, i.e., the 17-20,-20-21-bismethylenedioxy derivative of 2ξ-hydroxymethyl-2ξ,5ξ,11β,17α,21 - pentahydroxy - A - nor - 5 - pregnen-20-one and 17-20, 20-21-bismethylenedioxy derivative of 2ξ - hydroxymethyl - 2ξ,5ξ,11α,17α,21 - pentahydroxy - A-nor-5-pregnen-20-one.

A 465-milligram aliquot of the above mixture of epimers is dissolved in 61 milliliters of ethanol and treated with a solution of 1.02 grams of sodium metaperiodate in about 20 milliliters of water, followed by 19 drops of sodium bicarbonate (5% aqueous solution) which raises the hydrogen ion concentration of the mixture to about pH 6. The mixture is stirred overnight and the alcohol as well as the bulk of the water are removed in vacuo. The residue is distributed between ethyl acetate and water and the aqueous layer is back-extracted with ethyl acetate. The combined organic extracts are washed with water and a saturated salt solution to afford, after drying, an amorphous foam which shows no selective absorption in the ultraviolet and absorbs in the infrared at 2.85–2.95$\mu$ (OH), 5.77$\mu$ (saturated 5-membered ketone) 9.1–9.2$\mu$. (bis-methylenedioxy group).

The residue obtained above is dissolved in 100 milliliters of methanol and allowed to react with 10 milliliters of a sodium alkoxide solution (prepared by dissolving 9.2 grams of sodium methoxide in 200 milliliters of methanol) at room temperature for two hours. The base is neutralized with acetic acid and the solvent is removed in vacuo. Water is added and the resulting solid is removed by filtration. The product shows $\lambda_{max.}^{MeOH}$ 2.33 m$\mu$ (log E 4.16)

The epimeric mixture so obtained is purified by partition-chromatography of Supercel-using methanol-formamide as the stationary phase and benzene as the mobile phase and taking 50 milliliter fractions. Fraction 12, after crystallization from acetone-Skellysolve B, gives the 17-20,20-21-bismethylenedioxy derivative of 11β,17α,21-trihydroxy-A-nor-3(5)-pregnene-2,20-dione, compound VII, melting at 241°–243° C.;

$[\alpha]_{max.}^{CHCl_3}$ −73.6°; $\lambda_{max.}^{CH_3CH}$ 234 m$\mu$ (log E 4.18); $\lambda_{max.}^{CHCl_3}$ 2.75–2.95$\mu$, 5.86$\mu$ (strong), 5.94$\mu$ (stronger), 6.12$\mu$ (strong), 9.05–9.15$\mu$; $\lambda_{max.}^{CH_3}$ 2.77$\mu$, 5.86$\mu$ (strong), 5.95$\mu$ (moderate); 6.14$\mu$ (moderate)

*Analysis.*—Calcd. for $C_{22}H_{30}O_6$: C, 67.67; H, 7.74. Found: C, 67.78; H, 7.80.

Fractions 10 and 11 afford an additional crop of the compound VII, 11β-isomer, which is found to be a single spot, i.e., a pure material by paper chromatography. Although this material melts at 217°–220° C., a mixed melting point determination with a sample of the material melting at 241°–243° C. is found to melt at 239°–241° C., indicating the compounds to be identical.

Cuts 15 and 16 are similarly crystallized from acetone-Skellysolve B to give the 17-20,20-21-bismethylenedioxy derivative of 11α,17α,21-trihydroxy-A-nor-3(5)-pregnene-2,20-dione, melting at 248°–251° C., $[\alpha]_D^{CHCl_3}$ −111°; $\lambda_{max.}^{CH_3OH}$ 233 m$\mu$ (log E 4.20); $\lambda_{max.}^{CHCl_3}$ 2.75$\mu$, 2.9$\mu$, 5.85$\mu$ (pronounced shoulder), 5.94$\mu$ (strong), 6.12$\mu$, (strong), 9.05–9.2$\mu$ (strong); $\lambda_{max.}^{CH_3}$ 2.76$\mu$, 2.9$\mu$, 5.92$\mu$ (strong), 5.84$\mu$ (stronger), 6.13$\mu$ (strong), 9.05–9.25$\mu$

*Analysis.*—Calcd. for $C_{22}H_{30}O_6$: C, 67.67; H, 7.74. Found: C, 67.78; H, 7.80.

Fractions 13 and 14 afford an additional crop of the 11α-isomer of compound VII, melting at 247°–251° C.

A total of 96 milligrams of compound VII obtained as described above, is treated with 4.8 milliliters of 60% formic acid at room temperature for three days. The mixture is distributed between chloroform and water and the aqueous layer is back-extracted with chloroform. The combined organic layers are washed with water, with sodium bicarbonate solution, and with a saturated solution of sodium chloride The desired product 11β,17α,21-trihydroxy-A-nor - 3(5) - pregnene - 2,20 - dione, compound VIII, is isolated by paper chromatography on Whatman paper #4 using methanol-formamide (1:1) as the stationary phase and chloroform as the mobile phase. An analytical sample, melting at 235°–237° C., is found to have the same mobility in the above system as prednisolone.

*Analysis.*—Calcd. for $C_{20}H_{28}O_5 \cdot \tfrac{1}{2}H_2O$: C, 67.24; H, 8.17. Found: C, 67.75; H, 8.17.

About 30 grams of sodium bismuthate is added to a solution of 1.5 grams of compound VIII, A-norhydrocortisone, in aqueous acetic acid. The mixture is protected from light and shaken for about 1.5 hours. A solution of 20 grams of sodium metabisulphite in 200 cubic centimeters of water is added and shaking is continued for 30 minutes. After the addition of 1 liter of 3 N aqueous sodium hydroxide, the steroid reaction product is isolated with ether-chloroform. The organic layer is again washed with base and then with water and a saturated sodium chloride solution. Removal of the solvent and crystallization gives the desired 11β-hydroxy-A-nor-3(5)-androstene-2,17-dione, compound IX.

About 2.50 grams of the above diketone (compound IX) is suspended in 50 milliliters of thiophene-free benzene and 0.04 mole of pyrrolidine is added. The mixture is stirred magnetically and heated at reflux on a Glas-col mantle until one mole of water has been collected. The mixture is concentrated to dryness in the absence of moisture and triturated with acetone to give the desired 3-N-pyrrolidinyl derivative, compound X.

This reaction product, compound X, is dissolved in ether and treated with 20 moles of methylmagnesium bromide in ether at reflux temperature for 10 hours. Excess of reagent is decomposed by the cautious addition of a saturated solution of ammonium chloride. Chloroform is added and the organic layer is washed with water and dried over magnesium sulfate. The solvent is removed in vacuo to give the crude 3-pyrrolidinyl derivative of the 17β-hydroxy-17α-methyl compound. Reversal of the protecting group at C-3 is effected by treatment with alkali in methanol-water to give the desired 11β-hydroxy-17α-methyl-A-nortestosterone, compound XI, which shows a marked anabolic activity but comparatively little androgenic activity.

Having thus described the subject matter of this invention, what is desired to secure by Letters Patent of the United States is:

1. A chemical compound represented by the formula:

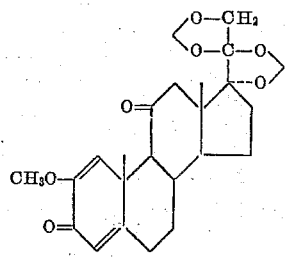

2. A chemical compound represented by the formula:

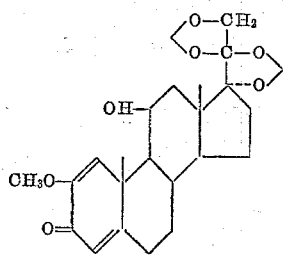

3. A chemical compound represented by the formula:

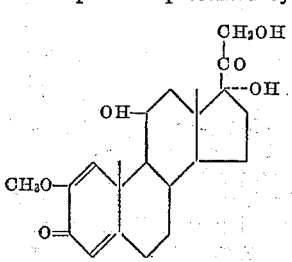

4. A chemical compound represented by the formula:

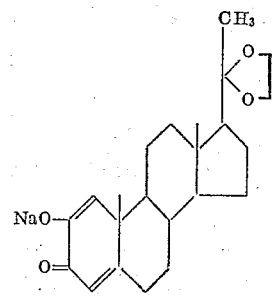

5. A chemical compound represented by the formula:

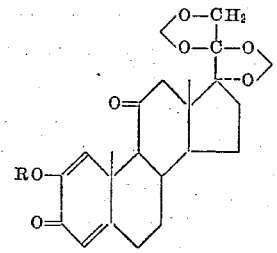

wherein R is lower alkyl.

6. A chemical compound represented by the formula:

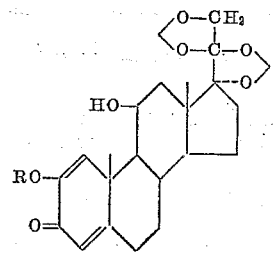

wherein R is lower alkyl.

References Cited in the file of this patent
UNITED STATES PATENTS

| | | |
|---|---|---|
| 2,774,787 | Geschickter et al. | Dec. 18, 1956 |
| 2,802,873 | Woodward | Aug. 13, 1957 |
| 2,826,593 | Rosenbranz et al. | Mar. 11, 1958 |
| 2,865,914 | Schneider et al. | Dec. 23, 1958 |
| 2,870,178 | Tristam | Jan. 20, 1959 |
| 2,948,740 | Baran | Aug. 9, 1960 |

OTHER REFERENCES

Baran: Journ. Amer. Chem. Soc. (1958), vol. 80, page 16.